(12) United States Patent
Corbell, Sr.

(10) Patent No.: US 9,010,316 B1
(45) Date of Patent: Apr. 21, 2015

(54) SOLAR PANEL SYSTEM

(71) Applicant: Wayne Douglas Corbell, Sr., New Port Richey, FL (US)

(72) Inventor: Wayne Douglas Corbell, Sr., New Port Richey, FL (US)

(*) Notice: Subject to any disclaimer, the term of this patent is extended or adjusted under 35 U.S.C. 154(b) by 0 days.

(21) Appl. No.: 14/027,182

(22) Filed: Sep. 14, 2013

(51) Int. Cl.
| | |
|---|---|
| *F24J 2/40* | (2006.01) |
| *F24J 2/38* | (2014.01) |
| *F24J 2/52* | (2006.01) |
| *H01L 31/0525* | (2014.01) |
| *H02J 7/02* | (2006.01) |
| *H02J 7/35* | (2006.01) |

(52) U.S. Cl.
CPC ........ *F24J 2/38* (2013.01); *F24J 2/5245* (2013.01); *H01L 31/058* (2013.01); *H02J 7/025* (2013.01); *H02J 7/35* (2013.01)

(58) Field of Classification Search
USPC .......... 126/571–573, 600, 698, 701, 704, 705
See application file for complete search history.

(56) References Cited

U.S. PATENT DOCUMENTS

| | | | | |
|---|---|---|---|---|
| 2,277,311 | A * | 3/1942 | Freeman ........................ | 126/640 |
| 4,080,957 | A * | 3/1978 | Bennett ......................... | 126/636 |
| 4,284,063 | A * | 8/1981 | Watson .......................... | 126/582 |
| 4,324,227 | A * | 4/1982 | Mountain ...................... | 126/583 |
| 4,458,672 | A * | 7/1984 | Wesley .......................... | 126/606 |
| 4,580,461 | A * | 4/1986 | Sears et al. .................... | 74/490.1 |
| 4,601,282 | A * | 7/1986 | Mountain ...................... | 126/574 |
| 5,600,124 | A * | 2/1997 | Berger .......................... | 250/203.4 |
| 5,798,517 | A * | 8/1998 | Berger .......................... | 250/203.4 |
| 5,924,415 | A * | 7/1999 | Esteverena .................... | 126/681 |
| 5,941,239 | A * | 8/1999 | Rogers .......................... | 126/698 |
| 8,378,282 | B2 * | 2/2013 | Li ................................. | 250/203.4 |
| 8,650,693 | B2 * | 2/2014 | Singh et al. ..................... | 15/77 |
| 2002/0002972 | A1 * | 1/2002 | Blake et al. ................... | 126/692 |
| 2002/0066473 | A1 * | 6/2002 | Levy et al. ..................... | 134/34 |
| 2009/0266353 | A1 * | 10/2009 | Lee ............................... | 126/593 |
| 2010/0206358 | A1 * | 8/2010 | Li .................................. | 136/246 |
| 2011/0079267 | A1 * | 4/2011 | Raymond et al. ............. | 136/246 |
| 2013/0057023 | A1 * | 3/2013 | Kim et al. ..................... | 296/181.1 |
| 2014/0041138 | A1 * | 2/2014 | Adler et al. ..................... | 15/102 |

\* cited by examiner

*Primary Examiner* — Jorge Pereiro

(57) ABSTRACT

A housing has a bottom, side panels, end panels, and a top, forming a chamber. The side and end panels have interior sections and slidable exterior sections. A solar energy collector, tubing or solar panels, is within the chamber. A cover plate is fabricated of a transparent material and is secured to the exterior section adjacent to the top. Lenses are coupled to the exterior section, and focus sunlight on the solar energy collector. Lift drivers vary the elevation of the lenses with respect to the solar energy collector. A gimbal assembly with a tilt driver operatively couples the housing to the roof to vary the angular tilt of the housing. A light sensor, a temperature sensor, and an associated controller adjust the elevation of the lenses and the tilt of the housing.

2 Claims, 7 Drawing Sheets

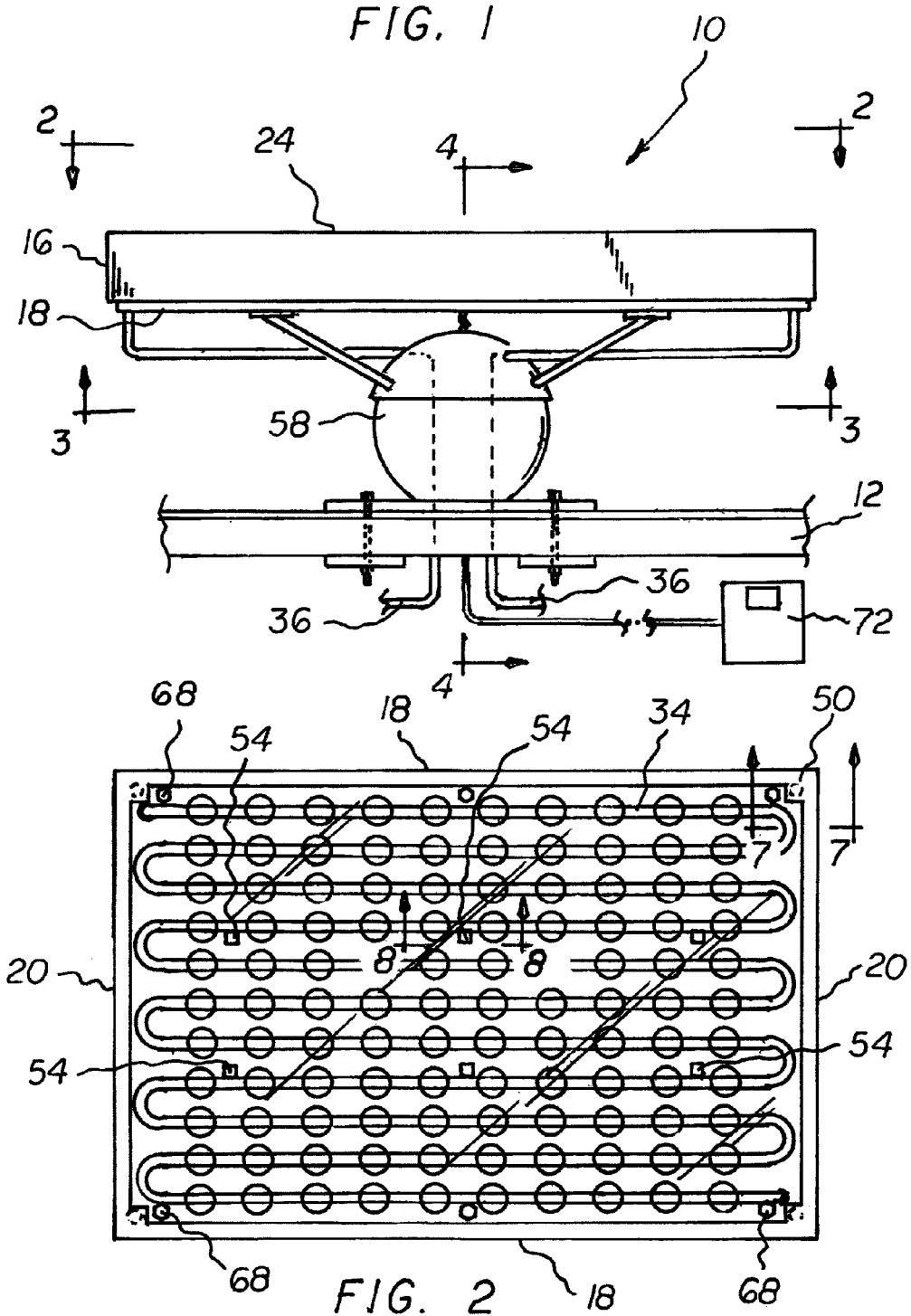

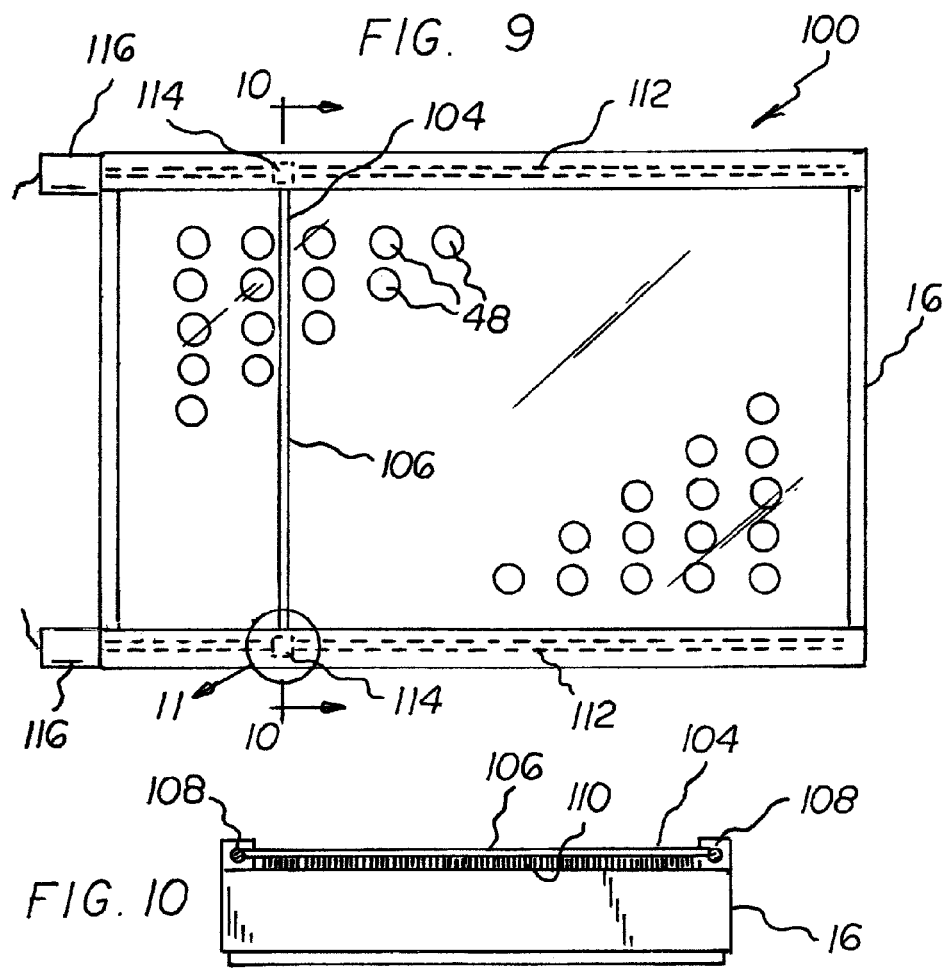
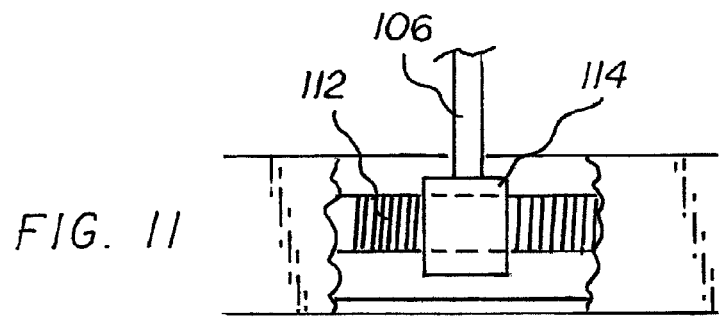

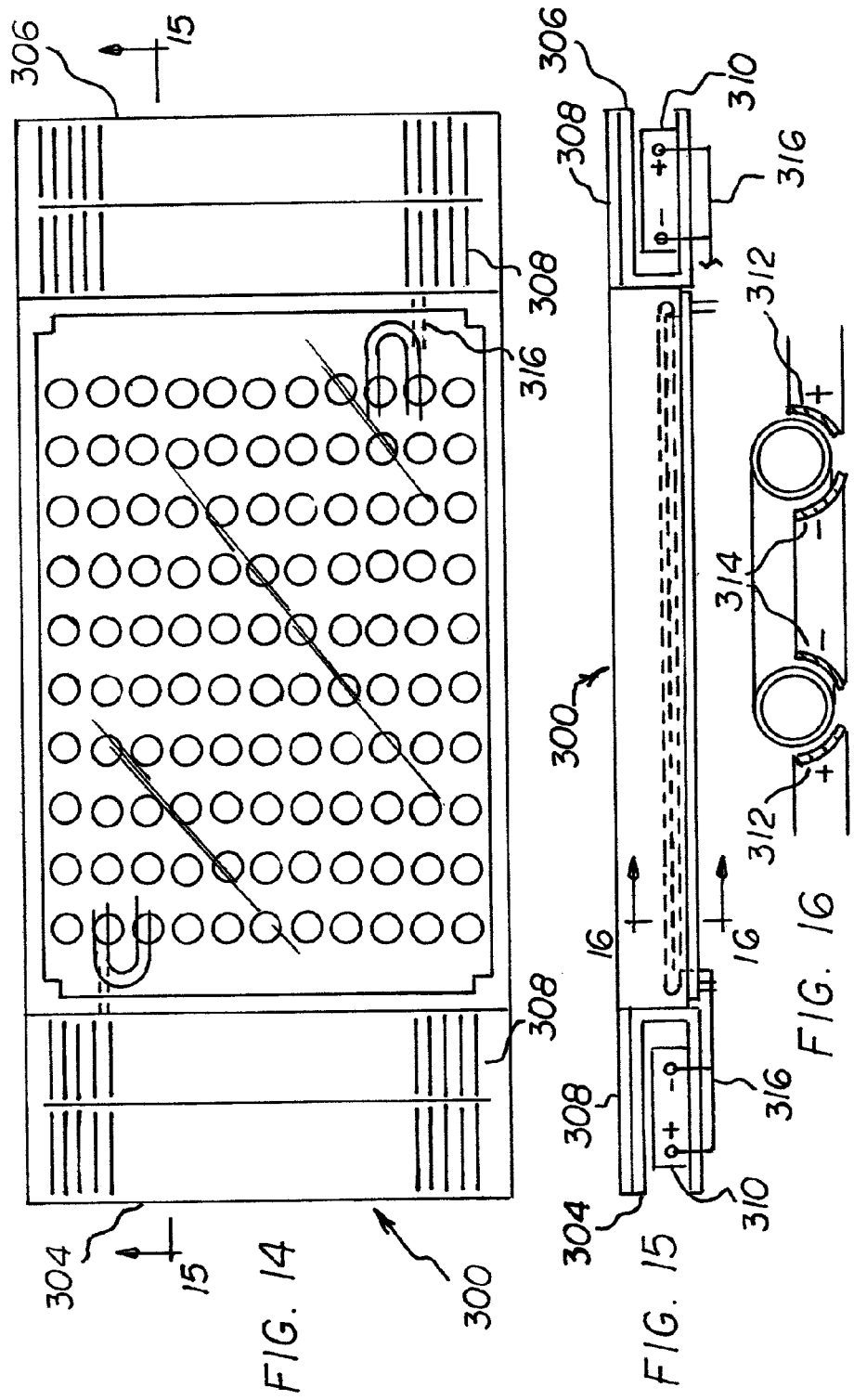

SOLAR PANEL SYSTEM

BACKGROUND OF THE INVENTION

Field of the Invention

The present invention relates to a solar panel system and more particularly pertains to being re-positionable in response to changes in the location of the sun and re-adjustable in response to changes in the temperature, the attaching and the re-positioning and the re-adjusting being done in a safe, convenient and economical manner.

SUMMARY OF THE INVENTION

In view of the foregoing disadvantages inherent in the known types of solar panel systems now present in the prior art, the present invention provides an improved solar panel system. As such, the general purpose of the present invention, which will be described subsequently in greater detail, is to provide a new and improved solar panel system and method which has all the advantages of the prior art and none of the disadvantages.

To attain this, the present invention essentially comprises a housing. The housing has a bottom, side panels, end panels and a top forming a chamber. The side and end panels have interior sections and slidable exterior sections.

A solar energy collector, tubing or solar panels, is provided within the chamber.

A cover plate is fabricated of a transparent material. The cover plate is secured to the exterior section adjacent to the top. Lenses are coupled to the exterior section. The lenses are adapted to focus sunlight on the solar energy collector. Lift drivers are adapted to vary the elevation of the lenses with respect to the solar energy collector.

A gimbal assemble with a tilt driver operatively couples the housing to the roof. In this manner the angular tilt of the housing may be varied.

A light sensor, a temperature sensor, and an associated controller adjust the elevation of the lenses and the tilt of the housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved solar panel system which has all of the advantages of the prior art solar panels and none of the disadvantages.

It is another object of the present invention to provide a new and improved solar panel system which may be easily and efficiently manufactured and marketed.

It is further object of the present invention to provide a new and improved solar panel system which is of durable and reliable constructions.

An even further object of the present invention is to provide a new and improved solar panel system which is susceptible of a low cost of manufacture with regard to both materials and labor, and which accordingly is then susceptible of low prices of sale to the consuming public, thereby making such solar panel system economically available to the buying public.

Lastly, another object of the present invention is to provide a solar panel system for being re-positionable in response to changes in the location of the sun and re-adjustable in response to changes in the temperature, the attaching and the re-positioning and the re-adjusting being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a solar panel system constructed in accordance with the principles of the present invention.

FIG. 2 is a plan view of the system taken along line 2-2 of FIG. 1.

FIG. 9 is a plan view of an optional cleaner assembly for the system shown in the prior Figures.

FIG. 10 is a cross sectional view taken along line 10-10 of FIG. 9.

FIG. 11 is an enlarged showing taken at Circle 11 of FIG. 9.

FIG. 14 is a plan view of an alternate embodiment of the invention.

FIG. 15 is a cross sectional view taken along line 15-15 of FIG. 14.

FIG. 16 is a cross sectional view taken along line 16-16 of FIG. 15.

The same reference numerals refer to the same parts throughout the various Figures.

DESCRIPTION OF THE PREFERRED EMBODIMENT

Figure 3:
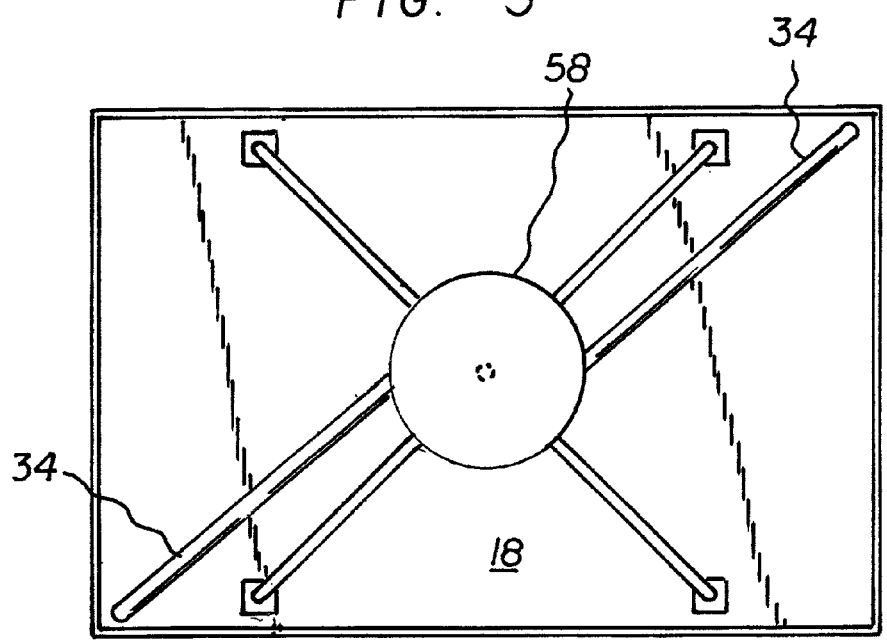
FIG. 3 is a bottom view of the system taken along line 3-3 of FIG. 1.
Figure 4:
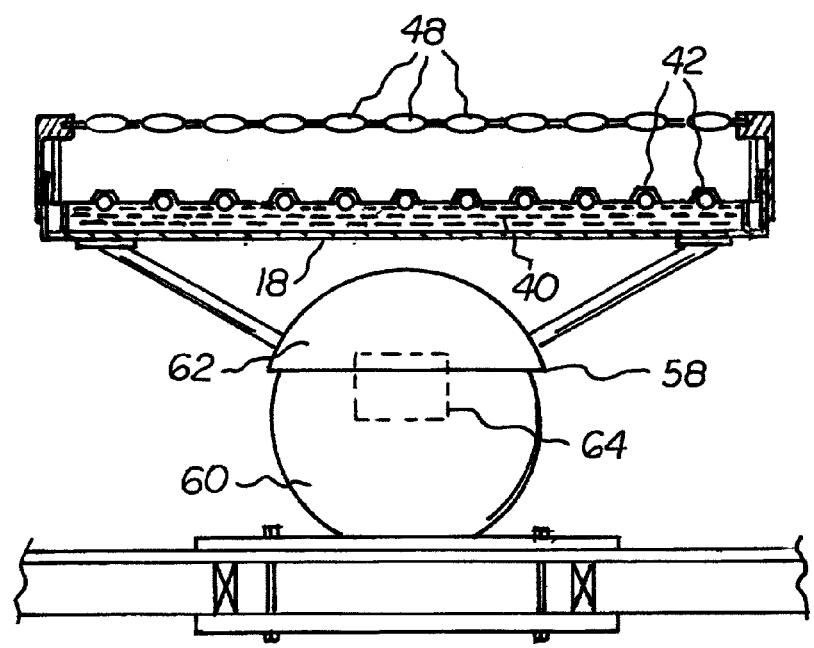
FIG. 4 is a cross sectional view taken along line 4-4 of FIG. 1.
Figure 5:
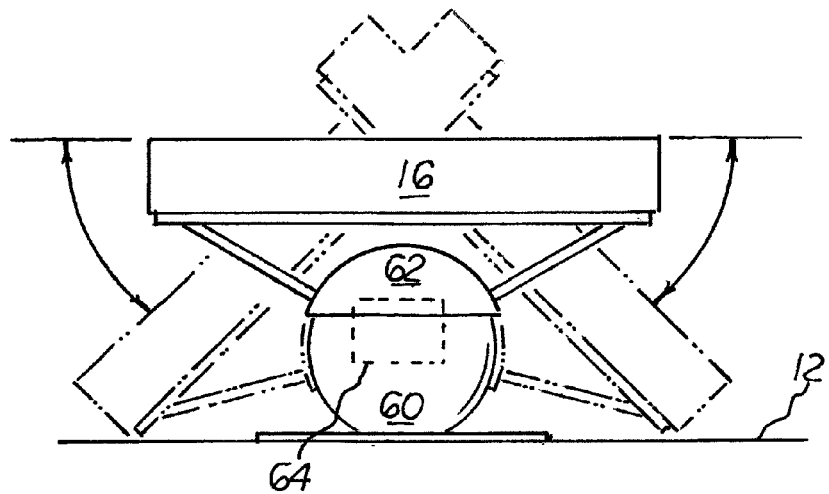
FIGS. 5 and 6 are front and side elevational views of the roof and housing in different angular orientations.
Figure 6:
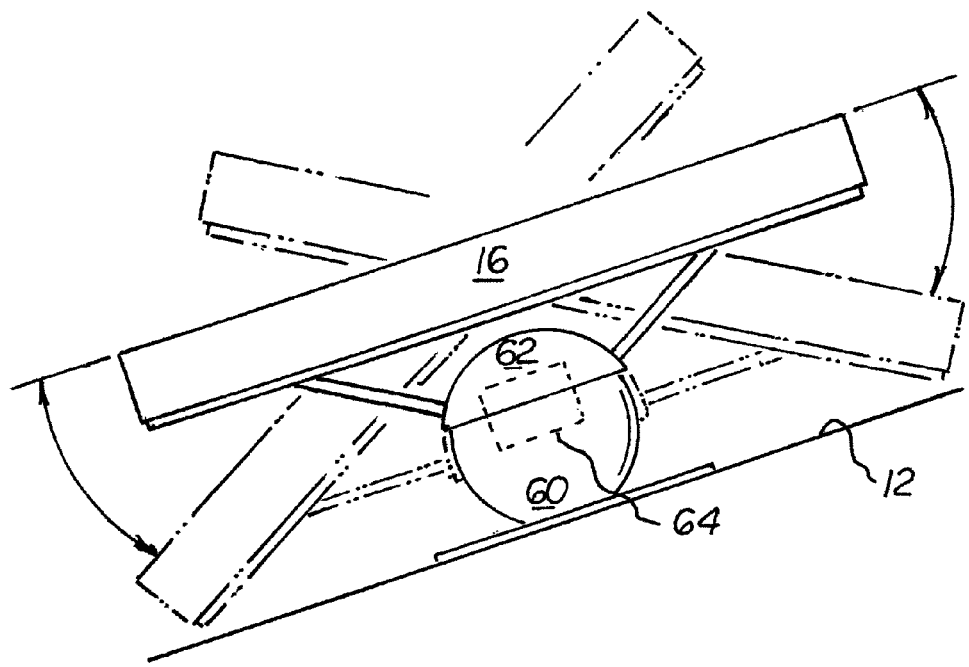
Figure 7:
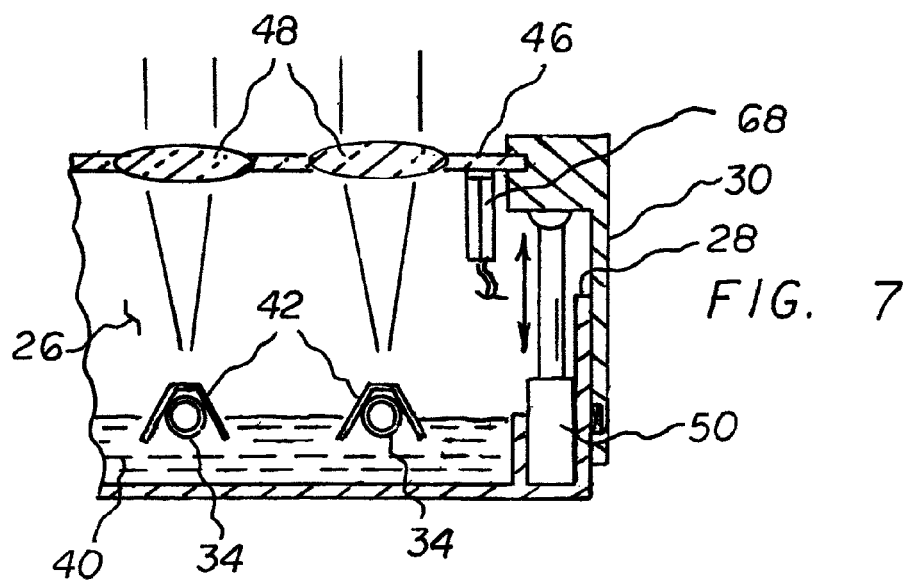
FIG. 7 is an enlarged illustration of a portion of the panel shown in FIG. 4.
Figure 8:
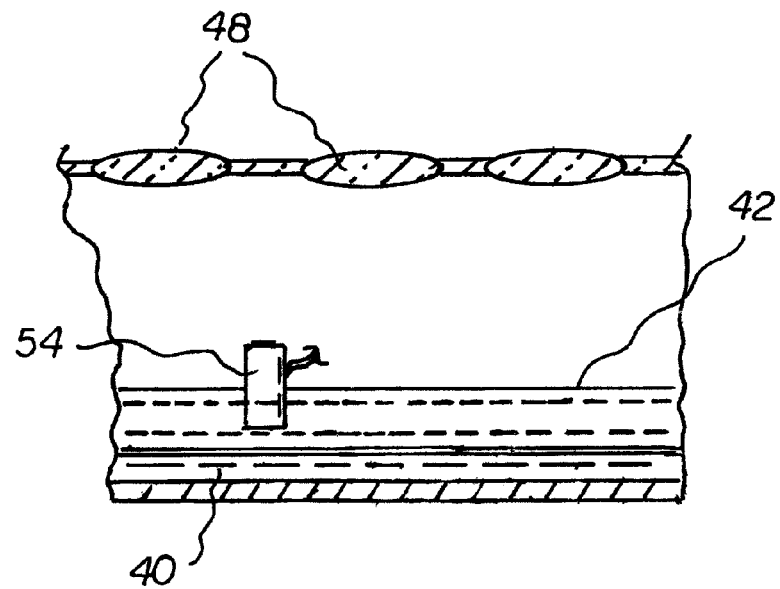
FIG. 8 is a cross sectional view taken along line 8-8 of FIG. 1.

With reference now to the drawings, and in particular to FIG. 1 thereof, the preferred embodiment of the new and improved solar panel system embodying the principles and concepts of the present invention and generally designated by the reference numeral 10 will be described.

The present invention, the solar panel system 10 is comprised of a plurality of components. Such components in their broadest context include a housing, a solar energy collector, a cover plate, a gimbal assemble, and a light sensor. Such components are individually configured and correlated with respect to each other so as to attain the desired objective.

First provided is a roof 12 is provided. The roof has a planar upper surface. The system is readily adapted for use with a flat roof or a pitched roof.

A rectilinear housing 16 is provided. The rectilinear housing has a rectangular bottom 18. The rectilinear housing has rectangular side panels 20. The rectilinear housing also has rectangular end panels 22. The rectilinear housing further has a top 24. In this manner the housing creates a chamber 26. The chamber is provided between the panels. The chamber is rectilinear. The chamber has four corners. The side panels and the end panels have interior sections 28. The interior sections are fixedly secured to the bottom. The side panels and the end panels have exterior sections 30. The exterior sections are slidable vertically with respect to the interior section. In this manner the size of the chamber is increased or decreased.

Tubing 34 is provided next. The tubing is provided in a serpentine array. The tubing is provided in the interior section of the chamber closer to the bottom than to the top. The tubing has terminal ends 36. The terminal ends extend to exterior of the housing. A gel 40 with thermally insulating properties is provided. The gel is provided within the housing. The gel is supported on the bottom and partially encompasses the tubing. Inverted U-shaped troughs 42 are provided. The inverted U-shaped troughs have central sections. The central sections partially encompass the tubing. The troughs have free ends. The free ends are secured in the gel.

Provided next is a cover plate 46. The cover plate is fabricated of a transparent material. The cover plate is secured to the exterior section of the side panels and end panels. In this manner the housing is enclosed. Lenses 48 are provided. The lenses are provided in the cover plate. The lenses are adapted to focus sunlight on the tubing. In this manner the temperature of the water flower through the tubing is raised. Four lift drivers 50 are provided. The four lift drivers are provided within the housing at the four corners. The four lift drivers are adapted to rise and lower the exterior section. The four lift drivers are further adapted to re-adjust the elevation of the lenses with respect to the interior section and tubing. In this manner the focusing distance between the lenses and the tubes is varied.

Control components are also provided. The control components include six temperature sensors 54. The six temperature sensors are provided within the housing. Each temperature sensor has a lower end. The lower end of the temperature sensor is secured to the gel. Each temperature sensor has an upper end. The upper end is provided above the troughs. The temperature sensors are adapted to control the lift drivers.

Further provided is a gimbal assembly 58. The gimbal assembly operatively couples the housing to the roof. The gimbal assembly includes a spherical element 60. The spherical element is attached to the roof. The gimbal assembly also includes a hemispherical element 62. The hemispherical element is attached to the housing. A tilt driver 64 is provided. The tilt driver is provided within the spherical component. In this manner the hemispherical element is slid on the spherical element. Also in this manner the housing is re-position. Further in this manner the angular orientation and tilt of the housing with respect to the roof and sunlight are varied.

The control components also include four light sensors 68. The light sensors are secured to the cover plate. The light sensors are provided adjacent to the four corners. The light sensors are adapted to power the tilt driver. In this manner the housing is re-positioned. Further in this manner the angular orientation of the housing is varied.

Provided last is an operator controlled controller 72. The operator controlled controller is coupled to the light sensor and the temperature sensor. In this manner the power of the lift drivers and the tilt driver are controlled. Further in this manner the efficiency of the system is maximized.

In an optional embodiment of the invention, the system 100 as set forth in claim 1 further includes a sweeper 104. The sweeper has a bar 106. The bar has opposed ends 108. The bar has a central extent. A row of downwardly extending bristles 110 with parallel water jets is provided. The row of downwardly extending bristles is supported by the central section. Two jack screws 112 are provided. The jack screws are rotatably secured to housing. The jack screws are provided parallel with respect to each other. The jack screws are positioned on opposite sides of the cover plate. A threaded collar 114 is provided. The threaded collar is provided at each end of the bar. The threaded collar is operatively coupled to the jack screws. Motors 116 are provided. The motors are coupled to the jack screws. In this manner rotation of the jack screws will move the bar with the bristles in sweeping contact with the cover plate. Further in this manner leaves and debris are from the cover plate. Note FIGS. 9, 10 and 11.

Figure 12:
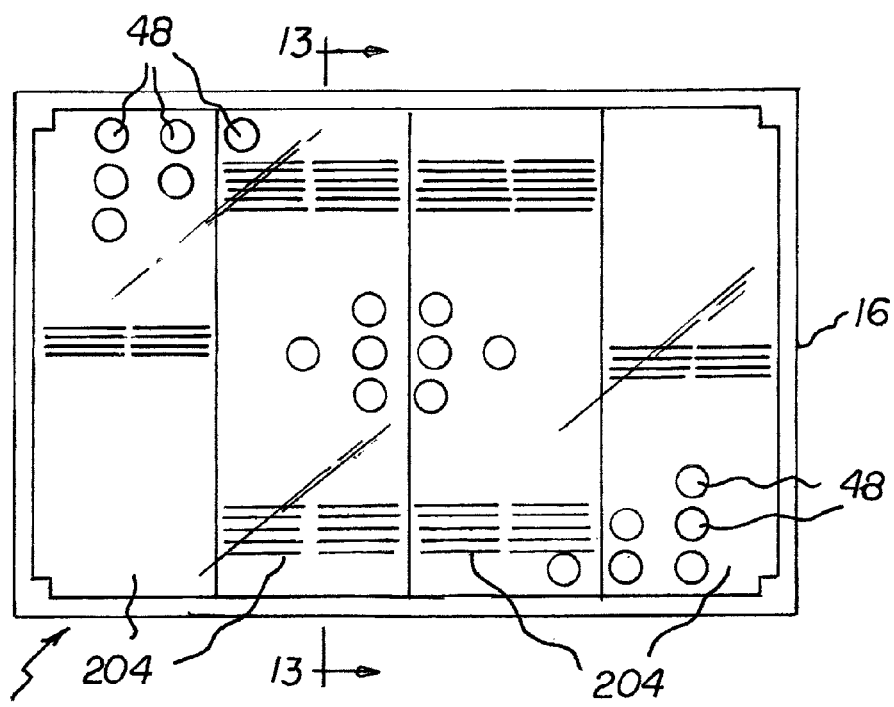
FIG. 12 is a plan view if another alternate embodiment of the invention.
Figure 13:
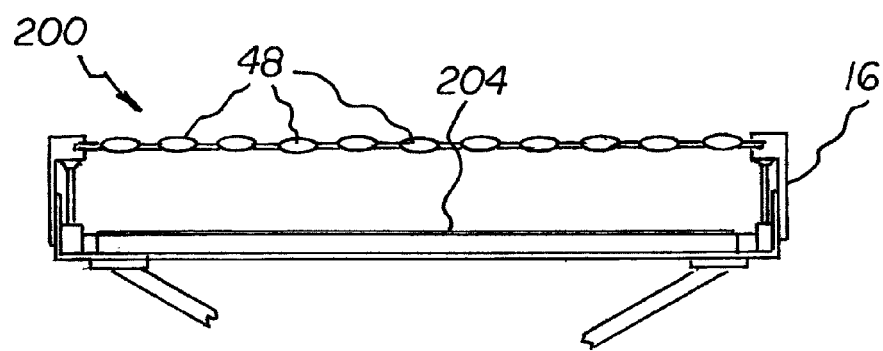
FIG. 13 is a cross sectional view taken along line 13-13 of FIG. 12.

Another embodiment of the invention, a modified system 200 is shown in FIGS. 12 and 13. In such system, the solar energy collector is a plurality of solar panels 204. In such embodiment, the lenses function to focus light for light intensification purposes, with or without increased heat from the lenses.

A final alternate embodiment of the invention is the system 300 illustrated in FIGS. 14, 15 and 16. In such embodiment, supplemental housing 304, 306 are provided and coupled to the housing at opposite ends thereof. Each supplemental housing includes a solar panel 308. An associated battery 310 is operatively coupled to each solar panel. A heat strip 312, 314 is operatively coupled to an associated battery. Each heat strip is coupled to a section of the array of tubing there adjacent. Electrical lines 316 couple each batteries and an associated heat strip. The tubing of each array of tubing has a circular cross sectional configuration with the heat strip coupled to a lower half of the tubing. In this manner, water in the tubing will continue to be heated even in the absence of sunlight.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar panel system comprising:
   a housing having a bottom and side panels and end panels and a top forming a chamber, the side and end panels formed with interior sections and slidable exterior sections,
   a solar energy collector within the the solar energy collector being an array of tubing with water flowing there through;
   a thermally insulating gel on the bottom of the housing and encompassing the tubing;
   a cover plate fabricated of a transparent material secured to the exterior section adjacent to the top, lenses coupled to the exterior section adapted to focus sunlight on the solar energy collector, lift drivers adapted to vary the elevation of the lenses with respect to the solar energy collector;
   a gimbal assembly with a tilt driver operatively coupling the housing to a roof to vary the angular tilt of the housing; and
   a light sensor and a temperature sensor and an associated controller to adjust the elevation of the lenses and the tilt of the housing.

2. A solar panel system (10) attached to a roof (12) of a building, the solar panel system being re-positionable in response to changes in the location of the sun and re-adjustable in response to changes in the temperature, the attaching and the re-positioning and the re-adjusting being done in a safe, convenient and economical manner, the system comprising, in combination:
   the roof (12) having a planar upper surface;
   a rectilinear housing (16) having a rectangular bottom (18), rectangular side panels (20), rectangular end panels (22) and a top (24), the housing creating a chamber (26) between the panels, the chamber being rectilinear with four corners, the side panels and the end panels formed with interior sections (28) fixedly secured to the bottom, the side panels and the end panels formed with exterior sections (30) slidable vertically with respect to the interior section to increase and decrease the size of the chamber;
   tubing (34) in a serpentine array within the interior section of the chamber closer to the bottom than to the top, the tubing having terminal ends (36) extending to exterior of the housing, a gel (40) within the housing supported on the bottom and partially encompassing the tubing, inverted U-shaped troughs (42) having central sections partially encompassing the tubing, the troughs having free ends secured in the gel;
   a cover plate (46) fabricated of a transparent material secured to the exterior section of the side panels and end panels to enclose the housing, lenses (48) formed in the cover plate adapted to focus sunlight on the tubing for raising the temperature of water flowing through the tubing, four lift drivers (50) within the housing at the four corners adapted to rise and lower the exterior section and re-adjust the elevation of the lenses with respect to the interior section and tubing for thereby varying a focusing distance between the lenses and the tubing;
   control components also including six temperature sensors (54) within the housing, each temperature sensor having a lower end secured to the gel, each temperature sensor having an upper end above the troughs, the temperature sensors adapted to control the lift drivers;
   a gimbal assembly (58) operatively coupling the housing to the roof, the gimbal assembly including a spherical element (60) attached to the roof, the gimbal assembly also including a hemispherical element (62) attached to the housing, a tilt driver (64) within the spherical component for sliding the hemispherical element on the spherical element to re-position the housing and vary the angular orientation and tilt of the housing with respect to the roof and sunlight;
   the control components including four light sensors (68) secured to the cover plate adjacent to the four corners, the light sensors adapted to power the tilt driver for re-positioning the housing and varying the angular orientation of the housing; and
   an operator controlled controller (72) coupled to the light sensor and the temperature sensor to control the powering of the lift drivers and the tilt driver to maximize the efficiency of the system.

* * * * *